March 10, 1959
B. LIPPEL
2,877,458

SYSTEM FOR DIVIDING A SURFACE OF REVOLUTION

Filed Sept. 25, 1956

INVENTOR.
BERNARD LIPPEL
BY
Harry M. Saragovitz
ATTORNEY

United States Patent Office 2,877,458

Patented Mar. 10, 1959

2,877,458

SYSTEM FOR DIVIDING A SURFACE OF REVOLUTION

Bernard Lippel, West Long Branch, N. J., assignor to the United States of America as represented by the Secretary of the Army Application September 25, 1956, Serial No. 612,074

9 Claims. (Cl. 340—345)

(Granted under Title 35, U. S. Code (1952), sec. 266)

The invention described herein may be manufactured and used by or for the Government for governmental purposes, without the payment of any royalty thereon.

This invention relates to a system for dividing a surface such as might be used for example in the production of coding devices for use for analog-digital conversion and is an improvement upon such a system as is disclosed in my prior Patent No. 2,590,110, patented March 25, 1952. As in said patent, the present invention relates to an electrical system for dividing a surface such as a disk or drum, into aliquot sectors or parts. It is to be understood however that the principles of the invention may also be applied to linear dividing engines. In particular, the invention relates to a system for producing a code record device, as for example, a disk, drum or plate, having commutating segments distributed thereon and arranged to quantize the displacement of the device in accordance with a digital number code.

In said prior patent, apparatus is provided for producing a coding device having commutating elements corresponding to a digital code. Said apparatus includes a means for rotatably supporting a photosensitive surface, a means producing an alternating voltage, constituting a frequency reference, means for driving the supporting means at an angular velocity proportional to the frequency of the alternating voltage, means arranged adjacent the photosensitized surface for exposing said photosensitized surface in a plurality of annular paths thereon, at radii differing by equal increments, and means operable in timed relation to said alternating voltage for exciting the means for exposing the photosensitive surface, to produce commutating segments thereon. In this arrangement, the angular displacement of the supporting means is related to the operation of the means for exposing the photosensitive surface, by reason of the fact that they are each made responsive to the alternating voltage, constituted as a frequency reference.

As distinguished from the invention of the aforementioned patent and constituting an improvement thereon, the present invention associates with the table or supporting means, or makes an integral part thereof, a means for producing electrical pulses in number proportional to the relative displacement of the table or supporting means, and at an instantaneous recurrence rate proportional to the rate of instantaneous displacement. The electrical pulses are supplied to the exposing means to excite it into operation. Said means makes use of the displacement of the table with respect to the supporting means to produce the synchronizing function and eliminates the need for a special type motor and power source or frequency reference.

An object of the invention is to provide a system for dividing a line surface or a surface of revolution into aliquot sectors or parts, which is simple in structure, and easy to operate.

Another object is to provide an improved surface dividing system having means associated therewith for assuring accuracy of operation and duplication of divided surfaces produced on successive cycles of operation.

Another more specific object of the invention is to provide a surface dividing system having a rotatable support or table, upon which is engraved a peripheral row of index marks, operable to relate the production of pulses to the angular displacement of the table.

Another object of the invention is to provide a divided surface capable of being operated at different selected speeds and producing the same degree of accuracy in the coded record.

A still further object of the invention is to permit the use of lower displacement speeds with a consequent reduction in bandwith response requirements of the exposing means utilized in my previous system.

A still further object of the invention is to eliminate the stringent necessity for constant displacement speeds of my prior patent.

Other objects will become manifest upon consideration of the following description and the disclosure of the accompanying drawings in which.

Figure 1:
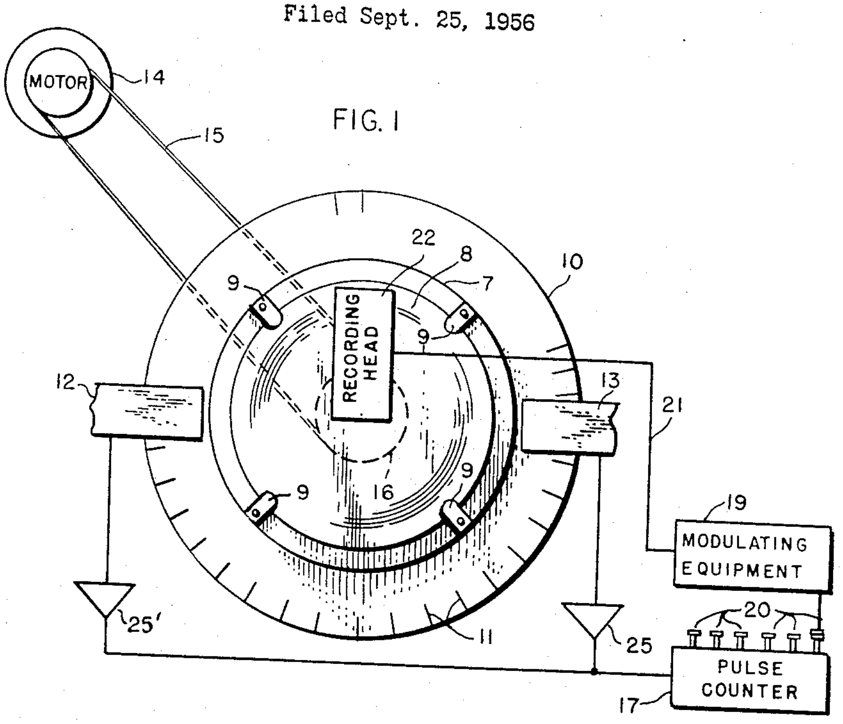
Fig. 1 is a schematic showing of the various parts and their cooperative relationship to each other.

In Fig. 1 of the drawings, a circular table 7 carries a clear or translucent glass plate 10 thereon. The glass plate may be secured to the table 7 by any conventional fastening means (not shown). The table 7 is equipped with a plurality of clamps 9 by which a recording blank 8 may be affixed to the table to rotate with the table and the glass plate. The recording blank may be a sheet or plate of a suitable material such as glass or metal bearing a photosensitized surface which when exposed to radiation and developed will produce a visible code. The sensitized surface may be made responsive to one of several types of radiation, such as, for example, visible light, ultra-violet light, or x-rays, or the like such as may be produced in pulses of different time duration. In the embodiment illustrated, the photosensitive surface is responsive to visible light. In such instance, the apparatus should be enclosed in a light tight housing or be used in a darkened room.

The table 7 is rotatably supported, by means not shown, for rotation about its central axis. Any conventional support means may be provided, as for example, a shaft may be affixed perpendicular to the table at its center, and spaced bearings provided for journaling said shaft. Also fixed to the table 7 is a pulley 16 connected by belt 15 to a similar pulley driven by an electrical motor 14. The belt and pulley arrangement is intended merely to represent a driving connection. Any conventional driving connection may be used as for example a direct connection as illustrated in my aforementioned patent may be provided. The electrical motor may also be provided with the customary starting and speed control equipment.

The glass plate 10 is further provided with an annular row of opaque equally angularly spaced index marks 11, adjacent its peripheral edge. The opaque marks may be placed upon the glass plate 10 by any suitable process such as engraving and filling or by a photographic process. The clamps 9 fix the recording blank to the table 7 and it thus becomes fixed positionally with respect to the index marks 11.

Figure 2:
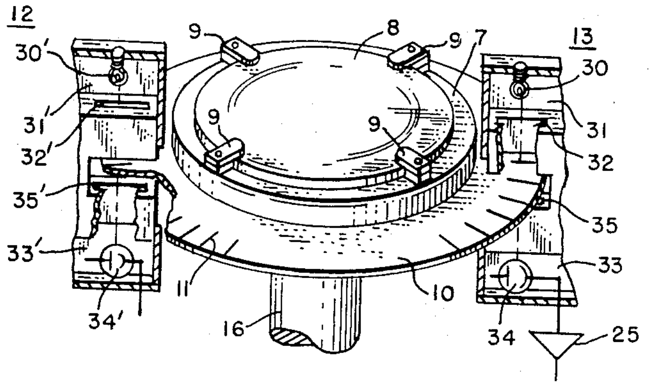
Fig. 2 is a more detailed schematic showing of the pickup device and of one of the possible adjusted relationships of the pickup devices to the index marks on the table.

Separately mounted adjacent the peripheral edge of the glass plate 10 are a pair of pickup devices 12 and 13. Fig. 2 illustrates by broken away views the structure of pickup devices which may be used to satisfy the requirements of the system. The structures of the two pickup units are substantially identical and that of pickup 13 only will be described. A lamp or other light source 30 is inclosed within a light tight housing or cavity 31 above the edge of the plate 10. The housing is formed with a narrow slit or aperture 32 at the bottom edge thereof in a position to cooperate with the opaque marks 11. A similar housing or cavity 33 incloses a photoelectric pick-up device such as a photocell 34 and is provided with a slit or aperture 35 in the upper portion thereof. The apertures 32 and 35 form a narrow light passage between the lamp 30 and the photocell 34. This passage is of such width and length as to be substantially blocked by the passage of an opaque index mark 11 on the plate 10 between the two inclosures 30 and 33. As each index mark moves through the space between the two slits the intensity of the transmitted light will be reduced to a minimum and increased again after passage of the mark. A peaked electrical impulse will thus be produced in the photocell. The peaked electrical impulse is amplified in a conventional amplifier 25 for application to the first stage of a pulse counter 17 (see Fig. 1).

The corresponding elements of the pickup 12 have been designated by primed reference characters and the description of the elements of pickup 13 applies to these elements also.

Fig. 2 also illustrates the location of the pickup devices 12 and 13 relative to the instantaneous position of two index marks, for one mode of operation. As shown, the pickup device 13 is directed to a point on said table 10 directly over one of the index marks 11 at the same instant that an index mark appears squarely before the viewing means of the pickup device 12. As the table is rotated the photocells will respond to the index marks in a manner more fully described hereinafter to produce a number of pulses which are equal to the number of marks that pass the viewing means of said devices. If desired the pickups may be provided with multiple slits so that the passage of a mark may result in the production of a number of pulses rather than a single pulse. An effective multiplication of the number of marks may be obtained in this manner. The advantage obtained by the use of multiple slits is apparent in the reduction of the work required to produce the glass index plate. As is disclosed in the aforementioned patent, the pulse counter 17 may be a binary counter and may include a series of multivibrator stages connected in cascade and provided with separate outputs 20. The first stage of the counter produces a square wave out-put having a frequency equal to one half the pulses per second fed to it from the pickup devices. The second stage of the counter has a square wave output having half the frequency of the first stage. Similarly the third stage has an output frequency equal to half the frequency of the second stage, the fourth stage half the frequency of the third stage and so on, with each succeeding stage having an output with half the frequency of the preceding stage.

Each stage of the pulse counter 17 is connected by means 20 to separate modulating equipment 19, having a further connection 21 to the recording head 22. The recording head 22 may be the same as that disclosed in my prior patent. It is provided with a plurality of lamps, separately housed in a housing having an aperture opening towards the recording blank 8. The recording head 22 is separately supported relative to the table 7, and extends radially of the table 7. In operation, as the lamps are excited the light emanating from the lamps through the aperture associated therewith, exposes the sensitized surface for an annular distance depending on the duration of such excitation and the rate of speed of the table. Inasmuch as the opaque index marks 11 are integral with the table and operate to generate the various exciting pulses for the various flash lamps, the duration of the excitation of the separate lamps is definitely related to the angular displacement of the table. It is thus obvious, that the table may be operated at any desired adjusted speed, and the duration of the separate excitation pulses and its frequency fed to the separate lamps will be automatically varied accordingly.

It will be clear that, although a binary counter is referred to above, one or more stages having division ratio greater than two may be substituted for one or more stages of the binary counter to permit dividing a circle into a number of parts not a power of two. For example, a ternary ring counter stage may be substituted for any binary stage. For the fabrication of digital encoding devices, as discussed in my above-mentioned patent, it is frequently desired that a binary-coded-decimal pattern of marks be recorded. In such case, a suitable arrangement of electronic counting stages which indicate the count in the desired binary-coded-decimal language may be used, and the count module ten may be used, and the individual binary outputs of the counter may then be connected to the recording head to provide the proper recording signals. Such binary-coded-decimal pulse counters are well known to the art and are in common use.

It is preferable that the number of electrical pulses furnished to the pulse counter 17 on a full revolution of the table be so related to the maximum count of the counter that the counter returns to its original count when exactly one revolution is made. In some cases, however, it may be convenient to have the counter go through different sequences of counting on successive revolutions, so that the recorded pattern is obtained by the superposition of different patterns recorded on a number of successive revolutions.

The apparatus of the present invention operates as follows: A blank 8 having a sensitized surface is clamped in place on the table 7 by clamps 9. The table 7 is then set to rotating at a convenient speed. As the index marks move past the viewing means of the photocells, electrical pulses are produced by the photocell, in response to the change in light intensity transmitted from the lamp 30 through the apertures 32 and 35. The pulses are applied to the counter device 17 which provides a successive division of the frequency of said pulses to produce separate outputs 20. The separate outputs 20 are fed through separate modulating equipment to the separate lamps in the recording head. The separate lamps are excited for given length of time depending upon the stage to which each is connected and the angular speed of the table 10.

It will be readily apparent that the speed of the table 7 may vary while producing a coded disc without effect on the final result. The sensitized surface and the glass plate 10 rotate as a unit and the variation in rotational speed is therefore cancelled out.

The function of the second pickup will now be explained. It is of course possible that errors may occur in the production of index marks on the glass plate 10. It is also possible that the plate 10 may be mounted in such a way that it is not absolutely concentric with the sensitized surface 8 or the table 7. This will cause variations in the recurrence rates of the pulses produced by the photoelectric pickup device which in turn will result in inaccuracies in the final exposed disc 8. Additional photoelectric pickups may be added to eliminate this difficulty by averaging out any such errors in recurrence rate. These additional pickups are represented by the pickup 12. Each additional pickup is identical to the structure described for pickup 13 and is so located with respect to the disc 10 that it would produce an electrical impulse at the same time if the index marks upon the disc were equally spaced and symmetrical to the axis of rotation. For example with an even number of opaque index marks on the disc and two pickups the pickups would be spaced at intervals of 180° about the disc. If an odd number of index marks were used the spacing would be 180° less one half the difference angle between adjacent index marks. The pickups may be adjustably mounted to be adapted to different patterns of index marks on the plate 10. It will be readily apparent that this principle can be extended to larger numbers of pickup heads spaced with substantial uniformity about the periphery of the disc.

Regardless of the number of the pickups used all pickups are connected through their respective amplifiers to the first stage of the pulse counter 17. This is shown in the connection of photocell 34' through amplifier 25' to the binary counter 17. Alternatively, both photocells might have been connected to the input of a single amplifier. If due to the inaccuracies described above the pulses do not occur at exactly the same instant the net effect of the two pickups is combined to produce a broadened single pulse which actuates the binary counter. The errors in recurrence rate of the pulses tend to cancel although the shape of the individual pulses may be altered.

The following advantages to be realized by the present invention not realized by the prior art devices, are simplification, improvement in accuracy of the product and improvement of ease of operation.

Having described the invention the manner of constructing the same and the best mode contemplated for carrying out the invention, what is regarded as the invention is set forth in the following claims.

What is claimed is:

1. A system for dividing a surface of revolution into aliquot parts comprising a rotatable support having means clamping a recording surface thereon and index marks arranged thereon, means for rotating said support, means arranged adjacent said index marks and responsive to movement of said marks relative thereto for producing a series of equally spaced signal pulses, means connected to said last named means for converting said signal pulses into a series of pulses having a spacing equal to a multiple of the spacing of said equally spaced pulses, means arranged in juxtaposition to said recording surface for imposing a record thereon and means connecting said last named means and said means for converting said pulses for dividing said surface into aliquot sectors.

2. A system for dividing a surface of revolution into aliquot parts comprising a rotatable support having clamping means thereon, a recording surface clamped to said rotatable support, index marks equally spaced along the surface of said support, means arranged adjacent said support and said index marks and responsive thereto to produce a continuing series of electrical pulses, means for converting said series of electrical pulses to a multiple series of electrical pulses each having a recurrence rate which is a submultiple of the continuing series of electrical pulses, means arranged in juxtaposition to said recording surface for imposing a record thereon in multiple paths and means connecting said last named means and said means for converting said series of electrical pulses for producing a record in each path dividing the surface into aliquot parts bearing a fixed geometrical relation to those in the adjacent paths.

3. A system for dividing a surface of revolution into aliquot parts comprising a rotatable table having clamping means thereon, a recording surface clamped thereon, index marks arranged in equally spaced relation around the peripheral edge of said table, light responsive means adjacent the peripheral edge of said table responsive to the movement of the index marks relative thereto for producing a continuous initial series of electrical pulses having an instantaneous recurrence rate which is a multiple of the instantaneous speed of said table, means having multiple outputs connected to said light responsive means for converting said pulses into a multiple series of pulses each having a spacing which is a multiple of and a recurrence rate which is a submultiple of said initial series of pulses, means arranged in juxtaposition relative to said recording surface having means thereon spaced along the surface of said recording surface for recording thereon a record in parallel paths and means connecting each of said means arranged in juxtaposition with said record with an output of said means having multiple outputs for dividing each recording path into a number of aliquot parts bearing a fixed geometrical relation to that in adjacent paths.

4. A system for dividing a surface of revolution into aliquot parts comprising, a circular table having means clamping a recording surface thereon, and index marks arranged in equally spaced relation around the peripheral edge thereof, means arranged adjacent the peripheral edge of said table responsive to the movement of the index marks relative thereto to produce a series of pulses having a recurrence rate which is a multiple of the instantaneous revolutions per minute of said table, means for converting said electrical pulses into a multiple series of pulses each having a recurrence rate which is a submultiple of that of the preceding series and means connected to said last named means and having means arranged in juxtaposition to said recording surface for recording in multiple paths concentric about the axis of said circular table and for dividing each path into a number of aliquot parts equal to a factorial of the number of divisions in adjacent paths.

5. A system for dividing a surface of revolution into aliquot parts comprising, a rotatable support having means for clamping a recording surface thereon and index marks thereon, a plurality of means arranged adjacent said marks and responsive to movement of said marks relative thereto for producing a series of substantially equally spaced signal pulses, means connected to all of said last named means for converting said signal pulses into a series of pulses having a spacing equal to a multiple of the spacing of the original pulses with any spacing errors averaged out, means arranged in juxtaposition to said recording surface for imposing a record thereon and means connecting said last named means and said means for converting said pulses for dividing said surface into aliquot sectors.

6. A system for dividing a surface of revolution into parts according to a predetermined pattern comprising a rotatable support having means clamping a recording surface thereto, means fixed to said support providing a line of index marks movable with said support, driving means connected to said support, means fixed adjacent to said movable support and in juxtaposition to said index marks responsive to movement of said marks relative thereto to produce a series of signals, means connected to said last named means and responsive to signals produced thereby to produce a multiple series of signals each having separate predetermined patterns and means positioned adjacent said support having means for imposing a record in multiple paths upon said movable surface connected to said last named means.

7. A system for dividing a surface in multiple paths according to a predetermined pattern comprising a movable recording surface means for moving said surface, recording means arranged in a fixed position relative to said movable surface having means for impressing a record on said surface in multiple paths, a series of index marks arranged to move with said surface, means responsive to the movement of said index marks for producing a signal for each passing mark, means connecting said last named means and the means for impressing a record in multiple paths for converting said signals into signals having a predetermined pattern of duration and recurrence.

8. A system for dividing a surface in multiple paths according to a predetermined pattern comprising a recording surface, a recording means for impressing a record in multiple paths on said recording surface and arranged for relative motion with respect to said surface, index means having marks equally spaced along a surface thereof, pickup means arranged for relative movement with respect to the marks on said index means for producing a series of equally spaced signals at a frequency proportional to the rate of relative motion, means connecting said last named means to said recording means to control the impression of records in the separate multiple paths, and means for producing relative motion between the recording surface and recording means and between the index means and the pickup means.

9. A system for dividing a plurality of circular paths upon a surface into equal parts according to a predetermined pattern, comprising a rotatable support having a surface to be divided mounted thereon, index marks associated with said support to move therewith, means stationarily arranged in juxtaposition to said index on said rotatable support and responsive to movement of said index relative thereto to produce an electrical pulse each time an index mark moves past said means, means for receiving said electrical pulses and for simultaneously producing a plurality of series of electrical pulses, each series of pulses bearing a harmonic frequency relationship to each series adjoining it in frequency and means connected to said last named means and stationarily arranged adjacent said surface for marking said surface in multiple paths, each path being marked according to the frequency of one of the plurality of series of pulses.

References Cited in the file of this patent

UNITED STATES PATENTS

| | | |
|---|---|---|
| 2,590,110 | Lippel | Mar. 25, 1952 |
| 2,628,346 | Burkhart | Feb. 10, 1953 |
| 2,746,833 | Jackson | May 22, 1956 |
| 2,793,344 | Reynolds | May 21, 1957 |